(12) United States Patent
Yuan et al.

(10) Patent No.: US 10,509,255 B2
(45) Date of Patent: Dec. 17, 2019

(54) LIQUID CRYSTAL PANEL COMPRISING A COMPOSITE POLARIZING LAYER HAVING A FIRST POLARIZING LAYER AND A SECOND POLARIZING LAYER THAT COVERS A GROOVE FORMED IN A BLACK MATRIX IN A NON-DISPLAY AREA AND LIQUID CRYSTAL DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Shuai Yuan, Beijing (CN); Chunguang Tian, Beijing (CN); Xiaona Liu, Beijing (CN); Mengjie Wang, Beijing (CN); Yuqiong Chen, Beijing (CN); Ning Li, Beijing (CN); Chenchen Wu, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/916,112

(22) Filed: Mar. 8, 2018

(65) Prior Publication Data
US 2019/0033654 A1  Jan. 31, 2019

(30) Foreign Application Priority Data
Jul. 28, 2017 (CN) .......................... 2017 1 0631353

(51) Int. Cl.
*G02F 1/1335* (2006.01)
*G02F 1/1339* (2006.01)
(Continued)

(52) U.S. Cl.
CPC ...... *G02F 1/133512* (2013.01); *G02F 1/1339* (2013.01); *G02F 1/1341* (2013.01);
(Continued)

(58) Field of Classification Search
CPC ................. G02F 1/13458; G02F 2001/133562
See application file for complete search history.

(56) References Cited

U.S. PATENT DOCUMENTS

2006/0221287 A1\* 10/2006 Roh .................. G02F 1/133707
349/139
2009/0122240 A1\* 5/2009 Lim .................. G02F 1/133512
349/106
(Continued)

FOREIGN PATENT DOCUMENTS

| CN | 102402071 | 4/2012 |
| CN | 103454803 | 12/2013 |

(Continued)

OTHER PUBLICATIONS

Chinese Office Action with English translation, dated Aug. 6, 2019, Chinese Application No. 201710631353.5.

*Primary Examiner* — Paul C Lee
(74) *Attorney, Agent, or Firm* — Womble Bond Dickinson (US) LLP (57) ABSTRACT

A liquid crystal panel, comprising a first substrate and a second substrate opposite to each other, and liquid crystals and sealant disposed between the first substrate and the second substrate. The liquid crystal panel has a display area and a non-display area, the first substrate has a black matrix in which a groove is provided to separate the sealant from the display area.

17 Claims, 4 Drawing Sheets

(51) Int. Cl.
  *G02F 1/1341* (2006.01)
  *G02F 1/1333* (2006.01)

(52) U.S. Cl.
  CPC .... *G02F 1/13362* (2013.01); *G02F 1/133528* (2013.01); *G02F 1/133514* (2013.01); *G02F 2001/133388* (2013.01); *G02F 2001/133562* (2013.01); *G02F 2202/28* (2013.01)

(56) References Cited

U.S. PATENT DOCUMENTS

| | | | | |
|---|---|---|---|---|
| 2012/0099061 A1* | 4/2012 | Lee | ............ | G02B 5/22 349/110 |
| 2013/0141677 A1* | 6/2013 | Wu | ............ | G02F 1/133711 349/106 |
| 2013/0250227 A1* | 9/2013 | Kira | ............ | G02F 1/1339 349/153 |
| 2015/0131041 A1* | 5/2015 | Moriwaki | ............ | G02F 1/1337 349/106 |
| 2015/0168764 A1* | 6/2015 | Saeki | ............ | G02F 1/133512 349/42 |
| 2015/0185539 A1* | 7/2015 | Senokuchi | ............ | G02F 1/1339 349/58 |
| 2015/0241722 A1* | 8/2015 | Shiina | ............ | G02F 1/1339 349/106 |
| 2015/0323844 A1 | 11/2015 | Meng et al. | | |
| 2015/0378195 A1* | 12/2015 | Shimura | ............ | G02F 1/1337 349/123 |

FOREIGN PATENT DOCUMENTS

| | | |
|---|---|---|
| CN | 103744216 | 4/2014 |
| CN | 105093692 | 11/2015 |
| CN | 105607352 | 5/2016 |

\* cited by examiner

LIQUID CRYSTAL PANEL COMPRISING A COMPOSITE POLARIZING LAYER HAVING A FIRST POLARIZING LAYER AND A SECOND POLARIZING LAYER THAT COVERS A GROOVE FORMED IN A BLACK MATRIX IN A NON-DISPLAY AREA AND LIQUID CRYSTAL DISPLAY DEVICE

CROSS REFERENCE TO RELATED APPLICATION

This application claims priority to the patent application No. 201710631353.5 filed with the Patent Office of the People's Republic of China on Jul. 28, 2017, the disclosure of which is incorporated herein by reference.

TECHNICAL FIELD

The present disclosure relates to the field of display, in particular to a liquid crystal panel and a liquid crystal display device.

BACKGROUND

At present, a Liquid Crystal Display (LCD) is a common flat panel display, and a liquid crystal panel is an important component of the liquid crystal display.

Fabricating a liquid crystal display panel usually comprises aligning a color film substrate with an array substrate by means of an aligning technique. Specifically, the aligning technique usually includes instilling liquid crystals on the color film substrate and coating a sealant on the array substrate for securing. Then, the array substrate and the color substrate are aligned in a vacuum environment. Next, a UV curing process is performed to pre-cure the sealant, then the liquid crystal panel is put into a heating furnace to perform heat curing to the sealant.

SUMMARY

A liquid crystal panel provided in an embodiment of the present disclosure comprises a first substrate and a second substrate opposite to each other, liquid crystals and a sealant disposed between the first substrate and the second substrate. The liquid crystal panel has a display area and a non-display area, the first substrate is provided with a black matrix in which a groove is provided, the groove separating the sealant from the display area.

In some embodiments, the groove has a depth that is smaller than or equal to a thickness of the black matrix.

In some embodiments, the first substrate further comprises a base substrate and a composite polarizer arranged on a surface of the base substrate away from the second substrate, wherein the composite polarizer comprises a pressure sensitive adhesive adhered to the surface of the base substrate away from the second substrate, a first support layer, a composite polarizing layer and a second support layer, wherein the composite polarizing layer comprises a first polarizing layer covering the base substrate and a second polarizing layer that is in the non-display area and covers the groove, wherein a light transmission axis of the first polarizing layer is perpendicular to that of the second polarizing layer.

In some embodiments, a plane difference between the first polarizing layer and the second polarizing layer is filled by ultraviolet adhesives.

In some embodiments, the first substrate further comprises a base substrate and a combined polarizer arranged on a surface of the base substrate away from the second substrate, the combined polarizer comprises a first polarizer covering the base substrate and a second polarizing layer that is in the non-display area and covers the groove, a light transmission axis of the first polarizer is perpendicular to that of the second polarizer, wherein the first polarizer comprises a pressure sensitive adhesive adhered to the surface of the base substrate, a first support layer, a first polarizing layer and a second support layer, the second polarizer comprises a pressure sensitive adhesive adhered to a surface of the first polarizer, a third support layer, a second polarizing layer and a fourth support layer.

In some embodiments, a distance between the groove and the sealant is greater than or equal to 1 mm.

In some embodiments, the groove has a width of 1~2 mm.

In some embodiments, the black matrix has a thickness of 1.2~1.4 μm.

In some embodiments, the first substrate is one of a color film substrate and an array substrate, and the second substrate is the other of the color film substrate and the array substrate.

In some embodiments, the first substrate further comprises a base substrate, and an orthographic projection of the groove on the base substrate is in the non-display area of the liquid crystal panel.

In some embodiments, the black matrix is on a surface of the base substrate facing the second substrate, and the groove surrounds the display area.

In some embodiments, the black matrix is divided into a first black matrix and a second black matrix by the groove, the first black matrix is a square black matrix surrounding the groove, and the second black matrix is surrounded by the groove, wherein orthographic projections of the first black matrix and the sealant on the base substrate at least partially overlap.

Another embodiment of the disclosure provides liquid crystal display device, which may comprises any one of the above embodiments of the liquid crystal panel.

In some embodiments, the groove has a depth that is smaller than or equal to a thickness of the black matrix.

In some embodiments, the first substrate further comprises a base substrate and a composite polarizer arranged on a surface of the base substrate away from the second substrate, the composite polarizer comprises a pressure sensitive adhesive adhered to the surface of the base substrate away from the second substrate, a first support layer, a composite polarizing layer and a second support layer, the composite polarizing layer comprises a first polarizing layer covering the base substrate and a second polarizing layer that is in the non-display area and covers the groove, a light transmission axis of the first polarizing layer is perpendicular to that of the second polarizing layer.

In some embodiments, the first substrate further comprises a base substrate and a combined polarizer arranged on a surface of the base substrate away from the second substrate, the combined polarizer comprises a first polarizer covering the base substrate and a second polarizing layer that is in the non-display area and covers the groove, a light transmission axis of the first polarizer is perpendicular to that of the second polarizer, the first polarizer comprises a pressure sensitive adhesive adhered to the surface of the base substrate, a first support layer, a first polarizing layer and a second support layer, the second polarizer comprises a pressure sensitive adhesive adhered to a surface of the first polarizer, a third support layer, a second polarizing layer and a fourth support layer.

In some embodiments, the first substrate is one of the color film substrate and the array substrate, and the second substrate is the other of the color film substrate and the array substrate.

In some embodiments, the first substrate further comprises the base substrate, and an orthographic projection of the groove on the base substrate is in the non-display area of the liquid crystal panel.

In some embodiments, the black matrix is on the surface of the base substrate facing the second substrate, and the groove surrounds the display area.

In some embodiments, the black matrix is divided into a first black matrix and a second black matrix by the groove, the first black matrix is a square black matrix surrounding the groove, and the second black matrix is surrounded by the groove, wherein orthographic projections of the first black matrix and the sealant on the base substrate at least partially overlap.

DETAILED DESCRIPTION OF EMBODIMENTS

The liquid crystal panel and liquid crystal display device provided in embodiments of the present disclosure will be described in detail below by means of specific examples and with reference to the drawings. The reference signs that might be used in the text below are illustrated herein as follows:

sealant 110, display area 120, black matrix 130, array substrate 140, color film substrate 150, ultraviolet light 160, liquid crystal 170, sealant 210, display area 220, black matrix 230, first black matrix 231, second black matrix 232, base substrate 233, polarizing layer 234, composite polarizer 234A, combined polarizer 234B, pressure sensitive adhesive 261, support layer 262, first polarizing layer 263, second polarizing layer 264, ultraviolet (UV) adhesive 265, array substrate 240, color film substrate 250, groove 260, liquid crystal 270, polarizer 280.

Inventors of the application recognize that, for a conventional liquid crystal display panel and alignment process, before the sealant is cured after aligning the array substrate with the color film substrate, the liquid crystals between the array substrate and the color film substrate typically tends to spread. If the liquid crystals spread too fast, they might contact the sealant that has not been cured completely and be contaminated by impurity ions in the sealant, thus image sticking may be caused and the display quality will be affected.

Figure 1:
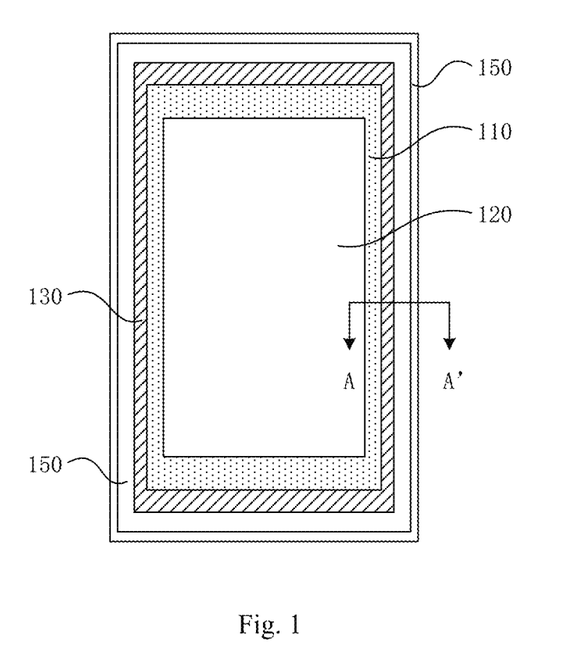
FIG. 1 is a top view of a liquid crystal panel known by the inventors.
Figure 2:
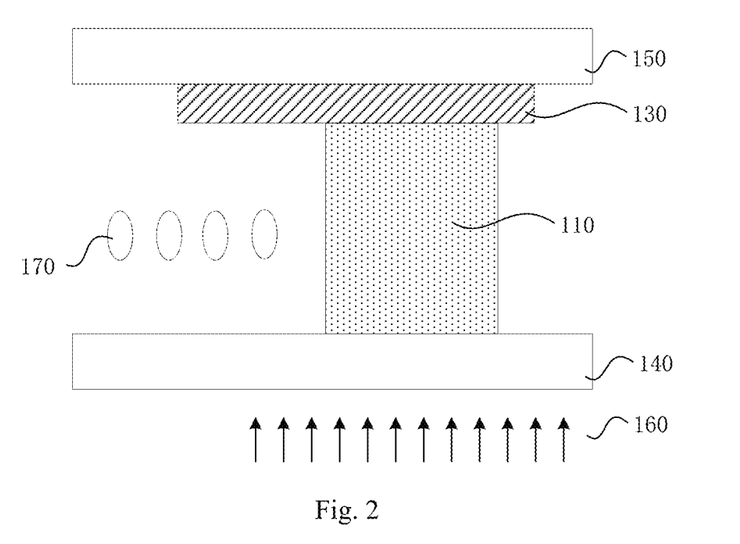
FIG. 2 is a cross-sectional view of the liquid crystal panel of FIG. 1 along line A-A'.

FIG. 1 and FIG. 2 schematically explain that during sealant curing after the aligning process, there is the risk of the liquid crystals in the liquid crystal panel being contaminated by the sealant. FIG. 1 is a top view of a liquid crystal panel known by the inventors, and FIG. 2 is a cross-sectional view of the liquid crystal panel of FIG. 1 along line A-A' as shown in FIG. 1. As shown in FIGS. 1 and 2, a sealant 110 is arranged outside of the display area 120 to surround the display area 120, a black matrix 130 is arranged on a surface of a color film substrate 150 facing an array substrate 140, and the sealant 110 is between the black matrix 130 of the color film substrate 150 and the array substrate 140. During curing of the sealant 110, ultraviolet light 160 irradiates the sealant 110 through a light-transmissive area of the array substrate 140. Since curing the sealant 110 takes place after the aligning process, if liquid crystals 170 spread too fast, they might contact the sealant that has not been cured completely. Thus, it is possible that the liquid crystals are contaminated by impurity ions in the sealant, which would cause image sticking and affect the display quality.

In order to reduce the risk of the sealant contaminating the liquid crystals due to fast spread of the liquid crystals, an embodiment of the present disclosure provides a liquid crystal panel, which comprises a first substrate, a second substrate, and liquid crystals and a sealant disposed between the first and second substrates. The liquid crystal panel has a display area and a non-display area, a black matrix is arranged on a surface of the first substrate facing the second substrate. The black matrix is provided with a groove to separate the sealant from the display area.

The first substrate in this embodiment may be any one of the array substrate and the color film substrate, and the second substrate is the other of the array substrate and the color film substrate. In this embodiment, by arranging a groove structure in the black matrix of the first substrate (e.g. the color film substrate), the spread speed of the liquid crystals can be slowed down and the time of spread can be prolonged during sealant curing. Specifically, the groove extends the spread path for the liquid crystals on the one hand, and increases the spread resistance for the liquid crystals on the other hand. During spread of the liquid crystals, the groove makes the liquid crystals flow through a longer path and change their flow directions for several times, and the liquid crystals have to fill the groove before contacting the sealant, thus the spread speed of the liquid crystals could be effectively slowed down and the time of spread cam be prolonged, which accordingly reduce the probability of the liquid crystals contacting the un-cured sealant and reduce the risk of the liquid crystals being contaminated.

In order to make the object, technical solutions and advantages of the present disclosure clearer, embodiments of the disclosure will be described in detail below with reference to the drawings. It shall be noted that embodiments of the present disclosure and features in the embodiments can be combined in any way as long as no confliction is caused.

Figure 3:
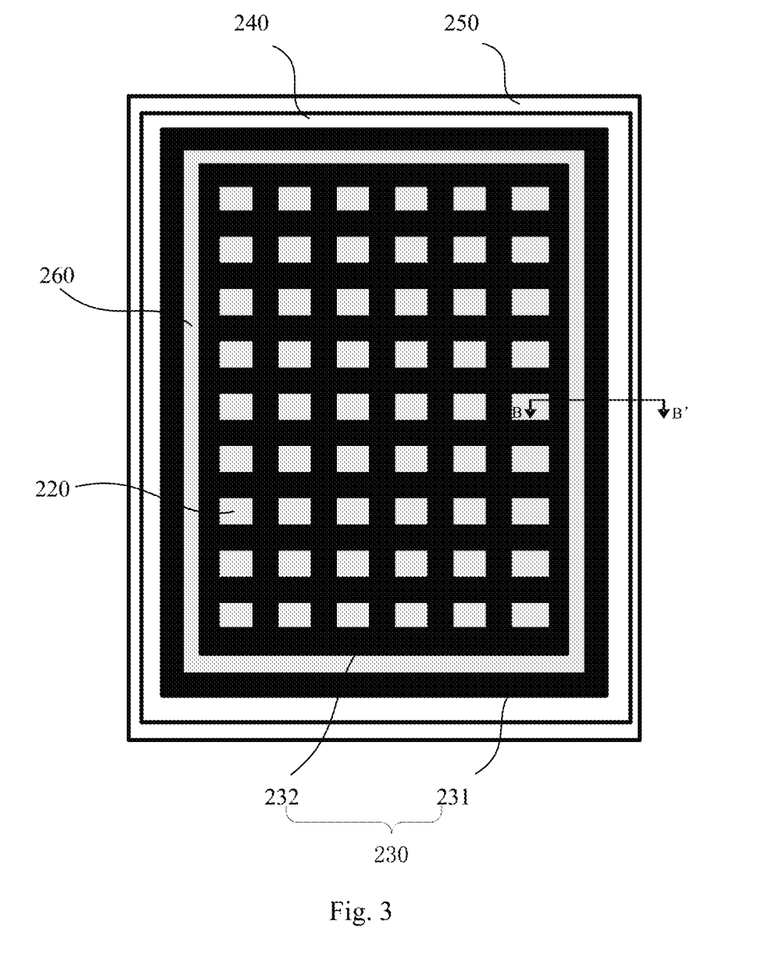
FIG. 3 is a top view of a liquid crystal panel provided in an embodiment of the present disclosure.
Figure 4:
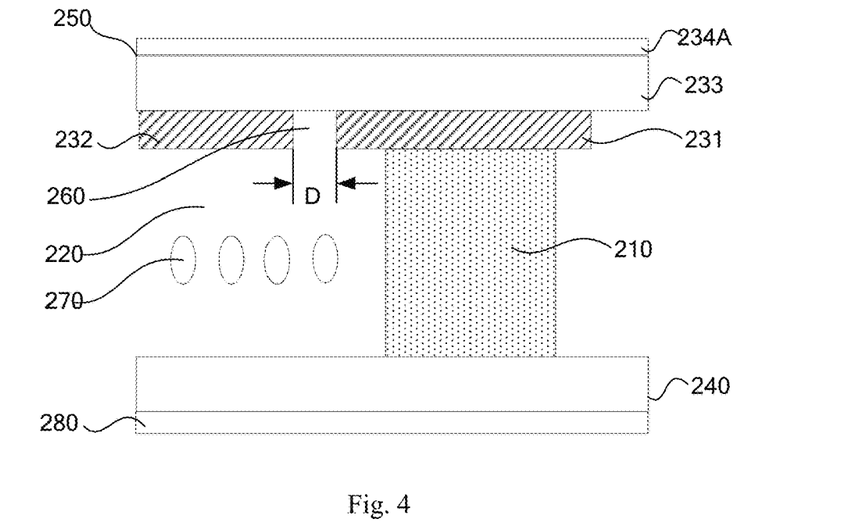
FIG. 4 is a cross-sectional view of a liquid crystal panel provided in an embodiment of the present disclosure along line B-B' as shown in FIG. 3.

FIG. 3 is a top view of a liquid crystal panel according to an embodiment of the present disclosure, and FIG. 4 is a cross-sectional view of the liquid crystal panel of FIG. 3 along line B-B'.

As shown in FIGS. 3 and 4, the liquid crystal panel of the embodiment comprises an array substrate 240 and a color film substrate 250 that are aligned together through a sealant 210, as well as liquid crystals 270 disposed between the array substrate 240 and the color film substrate 250, each of the array substrate 240 and the color film substrate 250 includes a display area and a non-display area, and the sealant 210 is in the non-display area and surrounding the display area.

A composite polarizer 234A is arranged on a surface of the color film substrate 250 away from the array substrate 240, and a polarizer 280 is arranged on a surface of the array substrate 240 away from the color film substrate 250. The composite polarizer 234A and the polarizer 280 may select light of particular polarization directions to enter into the liquid crystal panel.

The color film substrate 250 of the embodiment comprises a base substrate 233, a black matrix 230 and the composite polarizer 234A. The black matrix 230 is arranged on a surface of the base substrate 233 close to the array substrate 240, and a groove 260 is provided in the black matrix 230, which is located between the display area and the sealant 210 in a direction parallel to said surface of the array substrate. The sealant 210 is outside of the groove 260, i.e. the groove 260 is closer to the display area than the sealant 210, and the sealant 210 is at a distance from the groove 260. It shall be understood that in this embodiment, the groove 260 in the non-display area is a square groove around the display area.

The composite polarizer 234A is arranged on a surface of the base substrate 233 away from the array substrate 240 to cover the entire base substrate 233.

The groove 260 in this embodiment has a depth equal to a thickness of the black matrix 230, and the groove 260 can divide the black matrix 230 into two parts, i.e. a second black matrix 232 inside the groove 260 and a first black matrix 231 outside the groove 260, the first black matrix 231 surrounding the groove 260 and the second black matrix 232 being surrounded by the groove 260. Both the groove 260 and the first black matrix 231 are in the non-display area.

As shown in FIG. 4, a position of the first black matrix 231 corresponds to a position of the sealant after aligning the array substrate with the color film substrate. Considering the precision in coating, the coating region for the sealant needs to be at a certain distance, e.g. greater than or equal to 1 mm, from the groove 260, so as to slow down the spread of the liquid crystals and prevent the liquid crystals from approaching the sealant, and to avoid filling of the sealant into the groove 260.

In the present embodiment, the process of forming the black matrix 230 may be similar to the existing process of forming black matrix, which may include the steps of coating, exposing, developing, etc. performed in sequence. For example, firstly, black photoresists for making the black matrix 230 may be coated on the base substrate 233, then a mask is used for exposing; and the exposed black photoresists are developed using a developer to achieve a pattern of the black matrix 230. The process of forming the black matrix 230 may further include steps like cleaning the base substrate 233, which will not be elaborated herein. In an embodiment, by modifying the pattern of mask, the groove 260 can be formed while forming the pattern of the black matrix. In other embodiment, the groove can be fabricated in other ways, which is not limited herein.

In the above embodiment, by arranging a groove structure in the black matrix of the color film substrate, the spread speed of the liquid crystals can be slowed down and the time of spread can be prolonged during curing of the sealant. To be specific, the groove structure extends the spread path for the liquid crystals, and also increases the spread resistance for the liquid crystals. During spread of the liquid crystals, the groove enables the liquid crystals to flow through a longer path and to change the flow directions for several times, and the liquid crystals have to fill the groove before contacting the sealant, thus the spread speed of the liquid crystals is effectively slowed down and the time of spread is prolonged, which accordingly reduce the probability of the liquid crystals contacting the un-cured sealant and reduce the risk of contamination of the liquid crystals.

The color film substrate in the embodiment can be the first substrate mentioned above, and the array substrate can be the second substrate mentioned above. Alternatively, in the case where the black matrix is arranged on the array substrate, the array substrate will be equivalent to the above-mentioned first substrate and the color film substrate will be equivalent to the above-mentioned second substrate.

Figure 5:
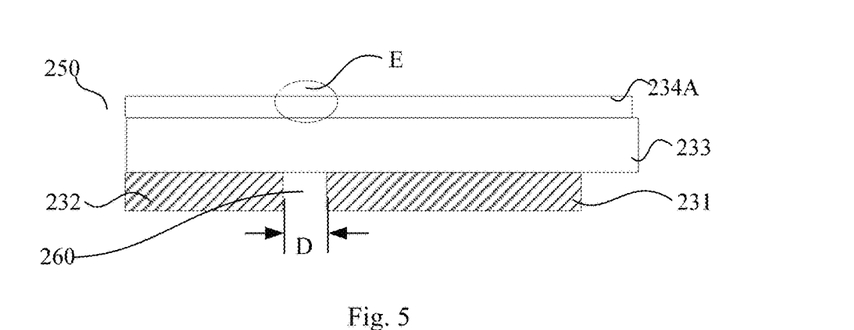
FIG. 5 is a schematic view of a color film substrate provided in another embodiment of the present disclosure.
Figure 6:
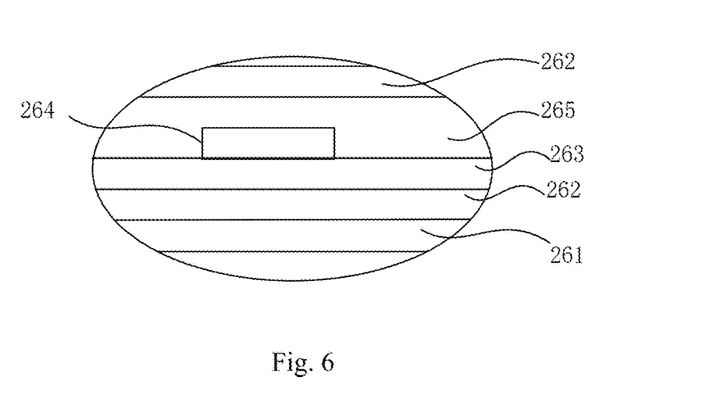
FIG. 6 is an enlarged view of the part E as shown in FIG. 5.

FIG. 5 is a schematic view of a color film substrate in an embodiment of the disclosure, and FIG. 6 is an enlarged view of the part E as shown in FIG. 5. As shown in FIG. 5, the color film substrate 250 in the embodiment comprises a base substrate 233, a composite polarizer 234A, and a first black matrix 231 and a second black matrix 232 spaced by a groove 260.

The composite polarizer 234A in the embodiment comprises a pressure sensitive adhesive 261 adhered to a surface of the base substrate 233, a first support layer 262, a composite polarizing layer and a second support layer 262, as shown in the enlarged view of FIG. 6.

In the present embodiment, at a position corresponding to the groove 260 between the first black matrix 231 and the second black matrix 232, the composite polarizing layer in the composite polarizer 234A of the color film substrate 250 comprises a first polarizing layer 263 and a second polarizing layer 264, the first polarizing layer 263 covering the entire base substrate 233, and the second polarizing layer 264 being in the non-display area and covering the groove 260, i.e. an orthographic projection of the second polarizing layer 264 on the base substrate 233 covers an orthographic projection of the groove 260 on the base substrate 233. The first polarizing layer 263 and the second polarizing layer 264 have their light transmission axes perpendicular to each other, so as to achieve an effect of blocking light.

As shown in FIGS. 5 and 6, in the composite polarizer 234A, at the position corresponding to the groove 260 between the first black matrix 231 and the second black matrix 232, the composite polarizer 234A has the following layers: the pressure sensitive adhesive (PSA) 261, the first support layer 262, the first polarizing layer 263, the second polarizing layer 264, the UV adhesive 265 and the second support layer 262. In the present embodiment, a plane difference between the first polarizing layer 263 and the second polarizing layer 264 can be filled by the UV adhesive 265.

Since the second polarizing layer 264 has a smaller width than the first polarizing layer 263, a plane difference occurs between the first polarizing layer 263 and the second polarizing layer 264. This plane difference between the first polarizing layer 263 and the second polarizing layer 264 is compensated in this embodiment by the UV adhesive 265, thus making the polarizing layers smooth and avoiding the occurrence of air bubbles after sticking the polarizer.

Figure 7:
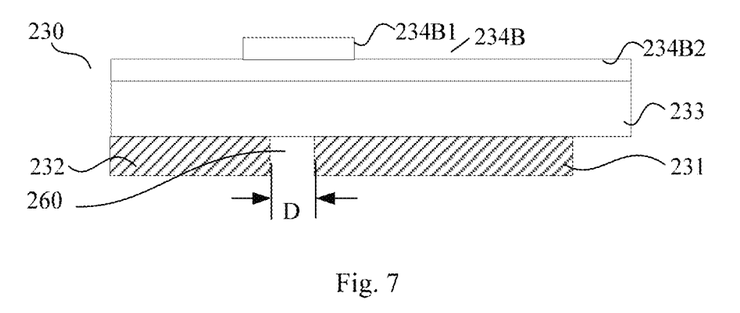
FIG. 7 is a schematic view of a color film substrate provided in still another embodiment of the present disclosure.

According to another embodiment of the disclosure, the color film substrate in the liquid crystal panel comprises a base substrate 233, a combined polarizer 234B, and a first black matrix 231 and the second black matrix 232 spaced by a groove 260.

As shown in FIG. 7, the color film substrate 230 in the embodiment comprises the first black matrix 213, the second black matrix 232, the base substrate 233 and the combined polarizer 234B, the combined polarizer 234B comprises a first polarizer 234B1 and a second polarizer 234B2.

The first polarizer 234B1 comprises a pressure sensitive adhesive adhered to a surface of the base substrate 233, a first support layer, a first polarizing layer and a second support layer, and the second polarizer 234B2 comprises a pressure sensitive adhesive adhered to a surface of the first polarizer 234B1, a third support layer, a second polarizing layer and a fourth support layer.

As shown in FIG. 7, the first polarizer 234B1 covers the entire base substrate 233, and the second polarizer 234B2 covers the groove 260 between the first black matrix 231 and the second black matrix 232, that is, the orthographic projection of the second polarizer 234B2 on the base substrate 233 contains the orthographic projection of the groove 260 on the base substrate 233. The first polarizer 234B1 and the second polarizer 234B2 have their transmission axes perpendicular to each other so as to achieve an effect of blocking light.

In an embodiment, a width D of the groove 260 between the first black matrix 231 and the second black matrix 232 can be within a range of 1~2 mm. In an embodiment, thicknesses of the first black matrix 231 and the second black matrix 232 can be within a range of 1.2~1.4 mm, which may effectively slow down spread of the liquid crystals.

According to another embodiment of the disclosure, a depth of the groove 260 between the first black matrix 231 and the second black matrix 232 is smaller than the thickness of the black matrix layer.

Figure 8:
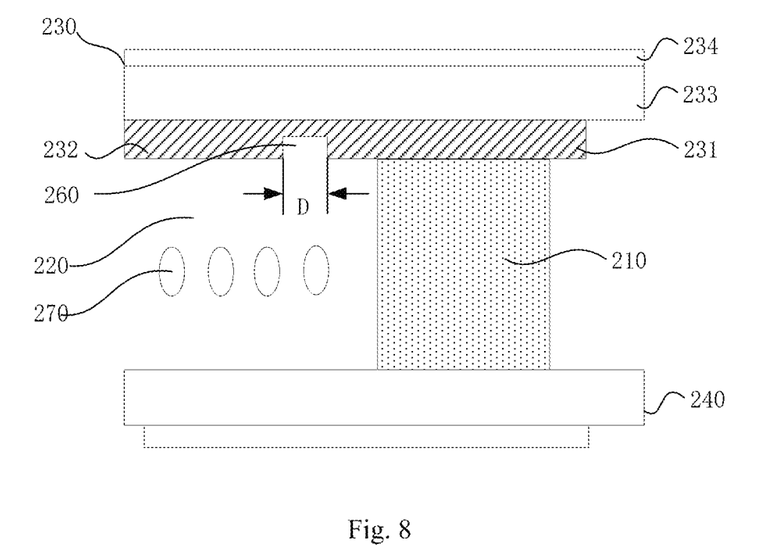
FIG. 8 is a cross-sectional view of a liquid crystal panel provided in yet another embodiment of the present disclosure along line B-B' as shown in FIG. 3.

FIG. 8 is a local cross-sectional view of a liquid crystal panel provided in an embodiment of the present disclosure, for example, a sectional view along line B-B' as shown in FIG. 3.

The color film substrate 230 in this embodiment comprises a base substrate 233, a black matrix 230 and a polarizer 234, the black matrix 230 is provided with a groove 260 whose width is D and whose depth is smaller than the thickness of the black matrix 230. The orthographic projection of the groove 260 on the base substrate 233 is in the non-display area of the liquid crystal panel.

The polarizer in the embodiment can be a common polarizer, a composite polarizer as described in the embodiment shown in FIG. 5, or a combined polarizer as described in the embodiment shown in FIG. 7. The depth of the groove 260 may be greater than or equal to half of the thickness of the black matrix 230.

In the embodiment, the depth of the groove 260 is smaller than the thickness of the black matrix 230, in this way, the possibility of light leakage can be reduced, the light blocking effect can be enhanced. In an example, in order to effectively slow down flowing of the liquid crystals, the depth of the groove 260 is greater than half of the thickness of the black matrix 230.

In the embodiment, by arranging a groove structure in the black matrix of the color film substrate, the spread speed of the liquid crystals can be slowed down and the spread time of the liquid crystals can be prolonged during curing of the sealant. To be specific, the groove structure extends the spread path for the liquid crystals on the one hand, and increases the spread resistance for the liquid crystals on the other hand. Due to the existence of the groove, during spread of the liquid crystals, the liquid crystals will flow through a longer path and have to change their flowing directions several times. Moreover, the liquid crystals have to fill the groove before contacting the sealant, thus the spread speed of the liquid crystals is effectively slowed down and the spread time thereof is prolonged, which accordingly reduce the probability of the liquid crystals contacting the un-cured sealant and reduce the risk of contamination of the liquid crystals.

An embodiment of the disclosure further provides a liquid crystal display device, which comprises the liquid crystal panel provided in any one of the above described embodiments of the disclosure. The principle by which the liquid crystal display device solves problems is similar to that of the above-described liquid crystal panel, so implementation of the liquid crystal display device is similar to that of the liquid crystal panel, and the repetitions will not be elaborated herein anymore.

The above described are merely some of the embodiments of the disclosure, but of course, various other embodiments are possible for the disclosure. Those skilled in the art can make many modifications and variations to the disclosure without departing from the spirit and substance of the disclosure, but these modifications and variation shall fall into the protection scope of the appended claims of the disclosure.

In the claims, the wording such as "comprise" and "include" does not exclude existence of other components or steps, and the article "a" or "an" does not exclude the plurality. The fact that several technical means are stated in different dependent claims does not mean that combinations of these technical means cannot be used to advantage.

The invention claimed is:

1. A liquid crystal panel, comprising:
a first substrate and a second substrate opposite to each other,
liquid crystals and a sealant disposed between the first substrate and the second substrate,
wherein the liquid crystal panel has a display area and a non-display area, the first substrate is provided with a black matrix in which a groove is provided, the groove separating the sealant from the display area,
wherein the first substrate further comprises a base substrate and a composite polarizer arranged on a surface of the base substrate away from the second substrate, wherein the composite polarizer comprises a pressure sensitive adhesive adhered to the surface of the base substrate away from the second substrate, a first support layer, a composite polarizing layer and a second support layer, wherein the composite polarizing layer comprises a first polarizing layer covering the base substrate and a second polarizing layer that is in the non-display area and covers the groove, wherein a light transmission axis of the first polarizing layer is perpendicular to that of the second polarizing layer.

2. The liquid crystal panel according to claim 1, wherein the groove has a depth that is smaller than or equal to a thickness of the black matrix.

3. The liquid crystal panel according to claim 1, wherein a plane difference between the first polarizing layer and the second polarizing layer is filled by ultraviolet adhesives.

4. A liquid crystal panel, comprising:
a first substrate and a second substrate opposite to each other,
liquid crystals and a sealant disposed between the first substrate and the second substrate,
wherein the liquid crystal panel has a display area and a non-display area, the first substrate is provided with a black matrix in which a groove is provided, the groove separating the sealant from the display area, wherein the first substrate further comprises a base substrate and a combined polarizer arranged on a surface of the base substrate away from the second substrate, wherein the combined polarizer comprises a first polarizer covering the base substrate and a second polarizing layer that is in the non-display area and covers the groove, a light transmission axis of the first polarizer is perpendicular to that of the second polarizer, wherein the first polarizer comprises a pressure sensitive adhesive adhered to the surface of the base substrate, a first support layer, a first polarizing layer and a second support layer, the second polarizer comprises a pressure sensitive adhesive adhered to a surface of the first polarizer, a third support layer, a second polarizing layer and a fourth support layer.

5. The liquid crystal panel according to claim 1, wherein a distance between the groove and the sealant is greater than or equal to 1 mm.

6. The liquid crystal panel according to claim 1, wherein the groove has a width of 1~2 mm.

7. The liquid crystal panel according to claim 1, wherein the black matrix has a thickness of 1.2~1.4 μm.

8. The liquid crystal panel according to claim 1, wherein the first substrate is one of a color film substrate and an array substrate, and the second substrate is the other of the color film substrate and the array substrate.

9. The liquid crystal panel according to claim 8, wherein an orthographic projection of the groove on the base substrate is in the non-display area of the liquid crystal panel.

10. The liquid crystal panel according to claim 9, wherein the black matrix is on a surface of the base substrate facing the second substrate, and the groove surrounds the display area.

11. A liquid crystal display device, comprising the liquid crystal panel according to claim 1.

12. The liquid crystal display device according to claim 11, wherein the groove has a depth that is smaller than or equal to a thickness of the black matrix.

13. The liquid crystal display device according to claim 11, wherein the first substrate is one of the color film substrate and the array substrate, and the second substrate is the other of the color film substrate and the array substrate.

14. The liquid crystal display device according to claim 13, wherein the first substrate further comprises the base substrate, and an orthographic projection of the groove on the base substrate is in the non-display area of the liquid crystal panel.

15. The liquid crystal display device according to claim 14, wherein the black matrix is on the surface of the base substrate facing the second substrate, and the groove surrounds the display area.

16. The liquid crystal display device according to claim 11, wherein the black matrix is divided into a first black matrix and a second black matrix by the groove, the first black matrix is a square black matrix surrounding the groove, and the second black matrix is surrounded by the groove, wherein orthographic projections of the first black matrix and the sealant on the base substrate at least partially overlap.

17. The liquid crystal panel according to claim 1, wherein the black matrix is divided into a first black matrix and a second black matrix by the groove, the first black matrix is a square black matrix surrounding the groove, and the second black matrix is surrounded by the groove, wherein orthographic projections of the first black matrix and the sealant on the base substrate at least partially overlap.

* * * * *